(12) United States Patent
Hodes et al.

(10) Patent No.: US 12,406,102 B2
(45) Date of Patent: Sep. 2, 2025

(54) DETECTION OF DATA STORAGE DEVICE REMOVAL

(71) Applicant: Western Digital Technologies, Inc., San Jose, CA (US)

(72) Inventors: Avichay Hodes, Kfar Ben Nun (IL); Karin Inbar, Ramat Hasharon (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 37 days.

(21) Appl. No.: 18/225,630

(22) Filed: Jul. 24, 2023

(65) Prior Publication Data

US 2024/0354451 A1     Oct. 24, 2024

Related U.S. Application Data

(60) Provisional application No. 63/460,497, filed on Apr. 19, 2023.

(51) Int. Cl.
*G06F 21/85* (2013.01)
*G06F 21/72* (2013.01)

(52) U.S. Cl.
CPC .............. *G06F 21/85* (2013.01); *G06F 21/72* (2013.01)

(58) Field of Classification Search
CPC ................................ G06F 21/85; G06F 21/72
(Continued)

(56) References Cited

U.S. PATENT DOCUMENTS 5,754,797 A    5/1998  Takahashi
6,321,277 B1 * 11/2001 Andresen ............ G06F 13/4081
                                                    710/100
(Continued)

FOREIGN PATENT DOCUMENTS

CN         103646669 A    3/2014
CN         111832057 A   10/2020
(Continued)

OTHER PUBLICATIONS

Sukhomlinov, Vadim et al., Mitigating Malicious Firmware by Detecting the Removal of a Storage Device, Technical Disclosure Commons, Defensive Publication Series, Aug. 2, 2019, pp. 1-10, Technical Disclosure Commons, downloaded at https://www.tdcommons.org/cgi/viewcontent.cgi?article=3450&context=dpubs_series.

(Continued)

*Primary Examiner* — Thanh T Le
(74) *Attorney, Agent, or Firm* — John D. Henkhaus

(57) ABSTRACT

Detecting the removal of a data storage device from a storage system involves first determining that a shorter pin of an electrical connector of a storage device is disconnected from a mating electrical connector, such as by sensing a voltage drop on that pin, then determining at a later time that a longer pin of the connector is disconnected from the mating connector. Responsive to determining that the longer pin was disconnected after a predetermined period of time after the shorter pin, a conclusion may be made that the storage device has been removed from the system as opposed to being subject to a simple device power aberration. Thus, responsive data destruction action(s) may be taken to render the data stored on the device inaccessible to the attacker thereby protecting the device even after the device is removed from the storage system.

20 Claims, 6 Drawing Sheets

(58) Field of Classification Search
USPC .......................................................... 726/34
See application file for complete search history.

(56) References Cited

U.S. PATENT DOCUMENTS

| | | | | |
|---|---|---|---|---|
| 8,812,860 | B1* | 8/2014 | Bray | G06F 21/34 |
| | | | | 713/182 |
| 9,928,386 | B1* | 3/2018 | Gardner | G06F 21/88 |
| 10,055,596 | B1* | 8/2018 | Czamara | G06F 21/87 |
| 10,063,011 | B2* | 8/2018 | Wanner | H01R 13/641 |
| 10,733,328 | B1 | 8/2020 | Perkins et al. | |
| 11,175,834 | B2* | 11/2021 | Kao | G06F 21/79 |
| 2004/0162923 | A1* | 8/2004 | Benson | G06F 11/3055 |
| | | | | 710/16 |
| 2005/0048816 | A1* | 3/2005 | Higgins | H01R 13/648 |
| | | | | 439/101 |
| 2006/0117393 | A1* | 6/2006 | Merry, Jr. | G06F 21/79 |
| | | | | 711/E12.1 |
| 2006/0146504 | A1 | 7/2006 | Belson et al. | |
| 2011/0113174 | A1* | 5/2011 | Fang | G06F 13/4081 |
| | | | | 710/300 |
| 2012/0254637 | A1* | 10/2012 | Yasaki | G06F 21/88 |
| | | | | 713/193 |
| 2013/0174264 | A1* | 7/2013 | Chan | G06F 21/88 |
| | | | | 726/26 |
| 2013/0286522 | A1* | 10/2013 | Mullins | H01R 13/665 |
| | | | | 361/58 |
| 2014/0218045 | A1* | 8/2014 | Shoykhet | G06F 13/4081 |
| | | | | 702/58 |
| 2014/0223037 | A1* | 8/2014 | Minoo | G06F 11/3051 |
| | | | | 710/16 |
| 2016/0116521 | A1* | 4/2016 | Flay | G01R 31/54 |
| | | | | 324/538 |
| 2018/0121354 | A1* | 5/2018 | Ishiyama | G06F 3/068 |
| 2018/0341773 | A1 | 11/2018 | Khatri et al. | |
| 2021/0216627 | A1 | 7/2021 | Grunwald et al. | |
| 2023/0091450 | A1* | 3/2023 | Ramesh | G06F 21/85 |
| | | | | 726/34 |

FOREIGN PATENT DOCUMENTS

| | | |
|---|---|---|
| KR | 20190079002 A | 7/2019 |
| WO | WO2017119698 A1 | 7/2017 |

OTHER PUBLICATIONS

Korean Intellectual Property Office (ISA/KR), PCT International Search Report and Written Opinion for counterpart International application No. PCT/US2023/084700, Apr. 24, 2024, 7 pages.

* cited by examiner

DETECTION OF DATA STORAGE DEVICE REMOVAL

FIELD OF EMBODIMENTS

Embodiments of the invention may relate generally to data storage systems, and particularly to approaches to detecting that a data storage device is removed from a data storage system.

BACKGROUND

As networked computing systems grow in numbers and capability, there is a need for more storage system capacity. Cloud computing and large-scale data processing further increase the need for digital data storage systems that are capable of transferring and holding significant amounts of data. One approach to providing sufficient data storage in data centers is the use of arrays of data storage devices typically configured and provisioned as one or more data storage systems. Many data storage devices can be housed in an electronics enclosure (sometimes referred to as a "rack"), which is typically a modular unit that can hold and operate independent data storage devices in an array, as well as computer processors, routers and other electronic equipment. Data centers typically include many rack-mountable data storage devices mounted within respective slots of an enclosure and which are used to store the massive amounts of data.

Data storage devices employ different measures of security to the storage system to avoid malicious operations. In flash storage devices, it is common practice to protect the data with firmware authentication and/or drive encryption. Physical removal of a storage device in some settings, such as a storage server, is highly irregular and may be the outcome of a malicious action.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to detecting the removal of a data storage device from a data storage system are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Figure 2:
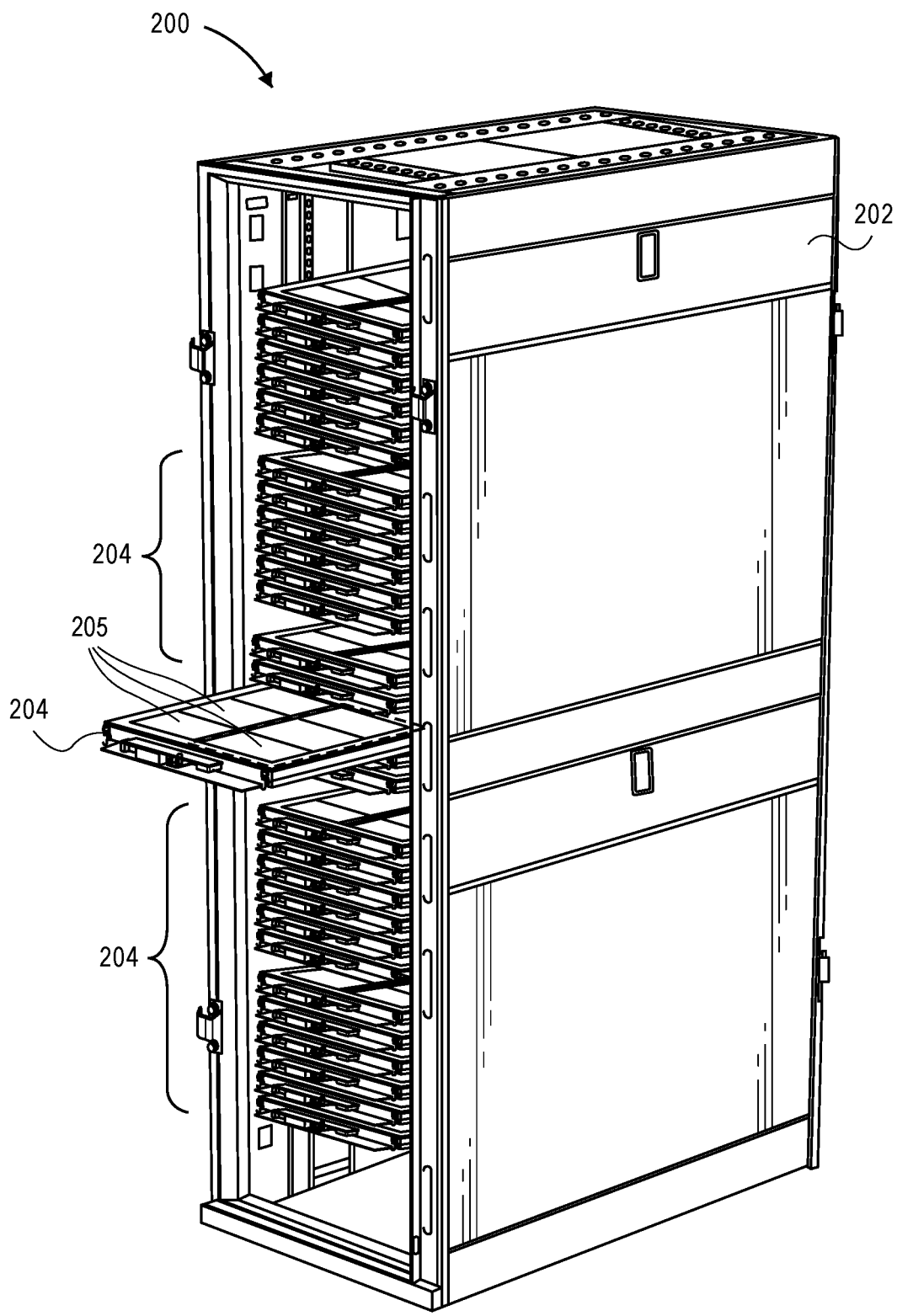
FIG. 2 is a perspective view illustrating a data storage system, according to an embodiment.

Physical Description of an Illustrative Operating Context-Data Storage Systems and Data Centers There is a commercial demand for high-capacity digital data storage systems, in which multiple data storage devices (DSDs), such as hard disk drives (HDDs), solid-state (e.g., flash memory based) drives (SSDs), tape drives, hybrid drives, and the like are housed in a common enclosure. Data storage systems often include large enclosures that house multiple shelves on which rows of DSDs are mounted. FIG. 2 is a perspective view illustrating one example data storage system, according to embodiments. A data storage system (DSS) 200 may comprise a system enclosure 202 (or "rack 202"), in which multiple data storage system trays 204 (or otherwise grouped) are housed. Each tray 204 may be placed or slid onto a corresponding shelf or rail within the rack 202, for example. Each tray is composed of multiple slots, compartments, mounting spaces in which a respective DSD 205 is housed and communicatively coupled with a system controller, such as via a backplane or otherwise. Typically, a rack 202 further houses such a system controller, and may further house switches, storage server(s), application server(s), a power supply, cooling fans, etc. While each tray 204 and constituent DSDs 205 in this example are illustrated as positioned horizontally within the rack 202, DSD trays 204 alternatively may be positioned vertically or otherwise within a comparable rack.

Generally, a data center (or, more generally, "mass storage system") may be likened to an extreme version of a data storage system (or multiple data storage systems working together), along with the power, cooling, space, and the like, needed to operate the storage, management, and sharing of data as well as the corresponding network infrastructure (e.g., routers, switches, firewalls, application-delivery controllers, and the like). Expanding on that notion, a "hyperscale" data center generally refers to a facility providing robust, scalable applications and storage services to individuals or other businesses. Exemplary implementations of hyperscale computing include cloud and big data storage, web service and social media platforms, enterprise data centers, and the like, which may consist of thousands of servers linked by an ultra-high speed fiber network. Because businesses depend on the security of their data stored in data centers, the security of a data center itself as well as constituent data storage devices are paramount concerns.

Figure 3:
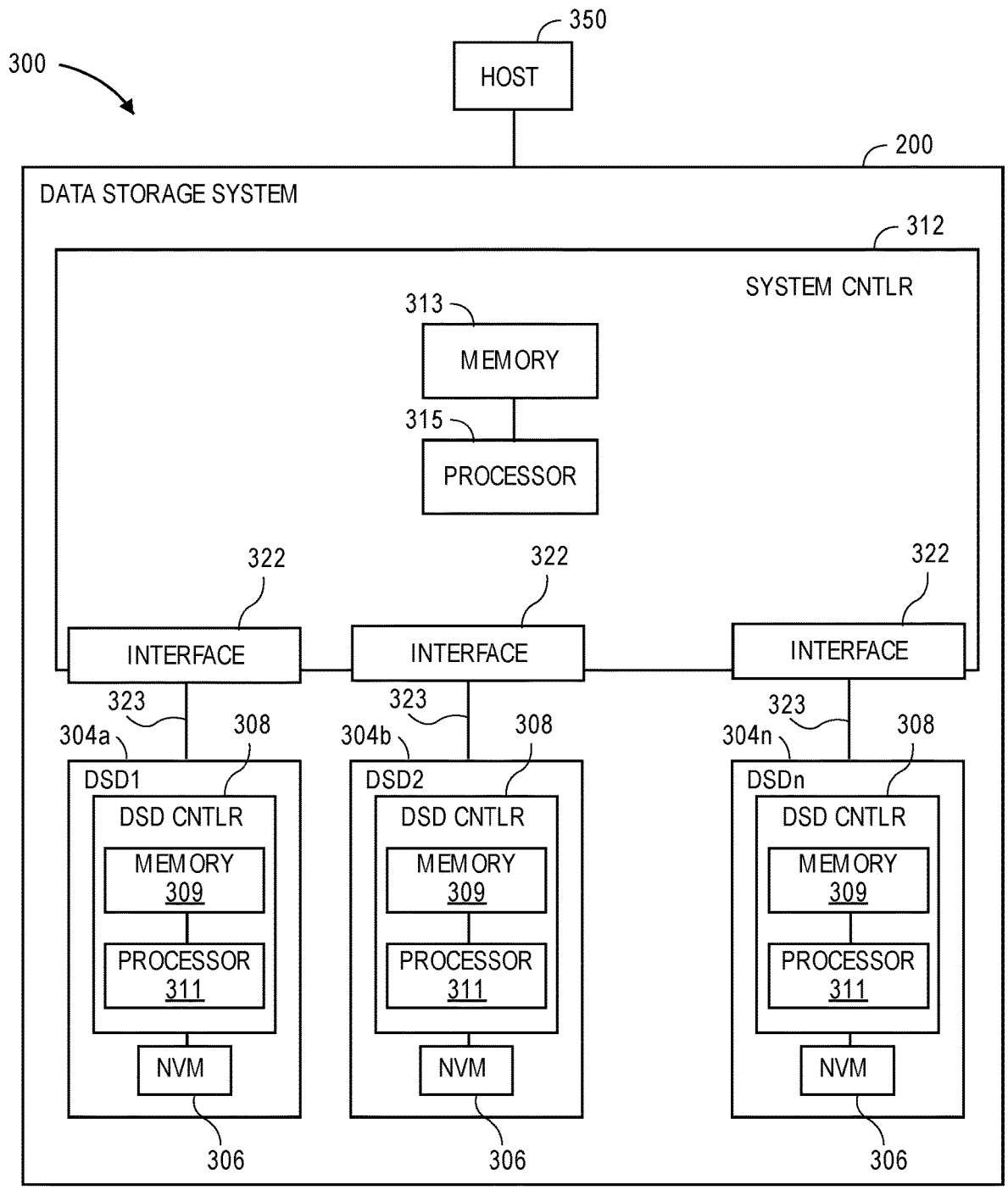
FIG. 3 is a block diagram illustrating a data storage system architecture, according to an embodiment.

An example data storage system may comprise multiple DSDs such as SSDs and/or HDDs, each communicative with and under the control of a system controller via a communication interface circuitry according to a corresponding communication protocol. FIG. 3 is a block diagram illustrating a data storage system architecture, according to an embodiment. Example architecture 300 illustrates a data storage system 200 that comprises multiple data storage devices (DSDs) 304a (DSD1), 304b (DSD2), and 304n (DSDn), where n represents an arbitrary number of DSDs (e.g., SSDs and/or HDDs) that may vary from implementation to implementation. Each DSD 304a-304n is communicative with and under the control of a storage system controller 312, via a communication interface 322 (e.g., electronic circuitry including electrical connectivity means) according to a corresponding communication protocol 323. Each DSD 304a-304n includes corresponding non-volatile memory (NVM) 306 (e.g., typically in the form of electronic non-volatile memory such as non-volatile memory components 170a-170n of FIG. 1A in the case of SSDs, or spinning magnetic disk media such as recording medium 120 of FIG. 1B in the case of HDDs) controlled by a respective DSD controller 308 ("DSD CNTLR" 308). Each DSD controller 308 includes at least a memory 309 and a processor 311, and the system controller 312 includes at least a memory 313 and a processor 315.

Processing, functions, procedures, actions, method steps, and the like, that are described herein as being performed or performable by a storage device controller such as DSD controller 308 of each DSD 304a-304n (or by system controller 312 of data storage system 200), may include enactment by execution of one or more sequences of instructions stored in one or more memory units and which, when executed by one or more processors, cause such performance. For example, and according to an embodiment, the DSD controller 308 comprises an application-specific integrated circuit (ASIC) comprising at least one memory unit (e.g., ROM memory 309) for storing such instructions (such as firmware, for a non-limiting example) and at least one processor (e.g., processor 311) for executing such instructions, enabling detection of the removal of a storage device from a data storage system such as data storage system 200. More broadly, DSD controller 308 may be embodied in any form of and/or combination of software, hardware, and firmware. An electronic controller in this context typically includes circuitry such as one or more processors for executing instructions, and may be implemented as a System On a Chip (SoC) electronic circuitry, which may include a memory, a microcontroller, a Digital Signal Processor (DSP), an ASIC, a Field Programmable Gate Array (FPGA), hard-wired logic, analog circuitry and/or a combination thereof, for non-limiting examples. Firmware, i.e., executable logic (e.g., programming code) which may be stored in or read into DSD memory 309, includes machine-executable instructions for execution by the respective DSD controller 308 in operating each respective DSD 303a-304n. Similarly, controller memory 313 includes machine-executable instructions for execution by the controller 312 in operating DSS 200.

The data storage system 200 may be communicatively coupled with a host 350, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 350 generally represents a client of the data storage system 200, and has the capability to make read and write requests (input/output or "I/O") to the data storage system 200. Note that the system controller 312 may also be referred to as a "host" because the term is often generally used in reference to any device that makes I/O calls to a data storage device or an array of devices, such as DSDs 304a-304n. Host 350 interacts with one or more DSDs 304a-304n via the interface 322 (e.g., a physical and electrical I/O interface) for transferring data to and from the DSDs 304a-304n, such as via a bus or network such as Ethernet or Wi-Fi or a bus standard such as Serial Advanced Technology Attachment (SATA), PCI (Peripheral Component Interconnect) express (PCIe), Small Computer System Interface (SCSI), or Serial Attached SCSI (SAS), for non-limiting examples.

Context

Recall that physical removal of a storage device from a rack of a data storage system or otherwise, in settings such as a storage server, is highly irregular and may be the outcome of a malicious action. For some applications, it would be critical to avoid data reaching an attacker. However, the controlling code is no longer capable of protecting the storage device and the data stored thereon once it is disconnected and/or removed from the system. In this context, when power to the storage device is dropped there is a challenge to discern between a malicious removal of the storage device and an occasional non-malicious power drop. Thus, detecting specifically the removal of a storage device from a storage rack, and responding according to pre-configured host settings, may be beneficial.

Detecting Removal of a Data Storage Device

Figure 4:
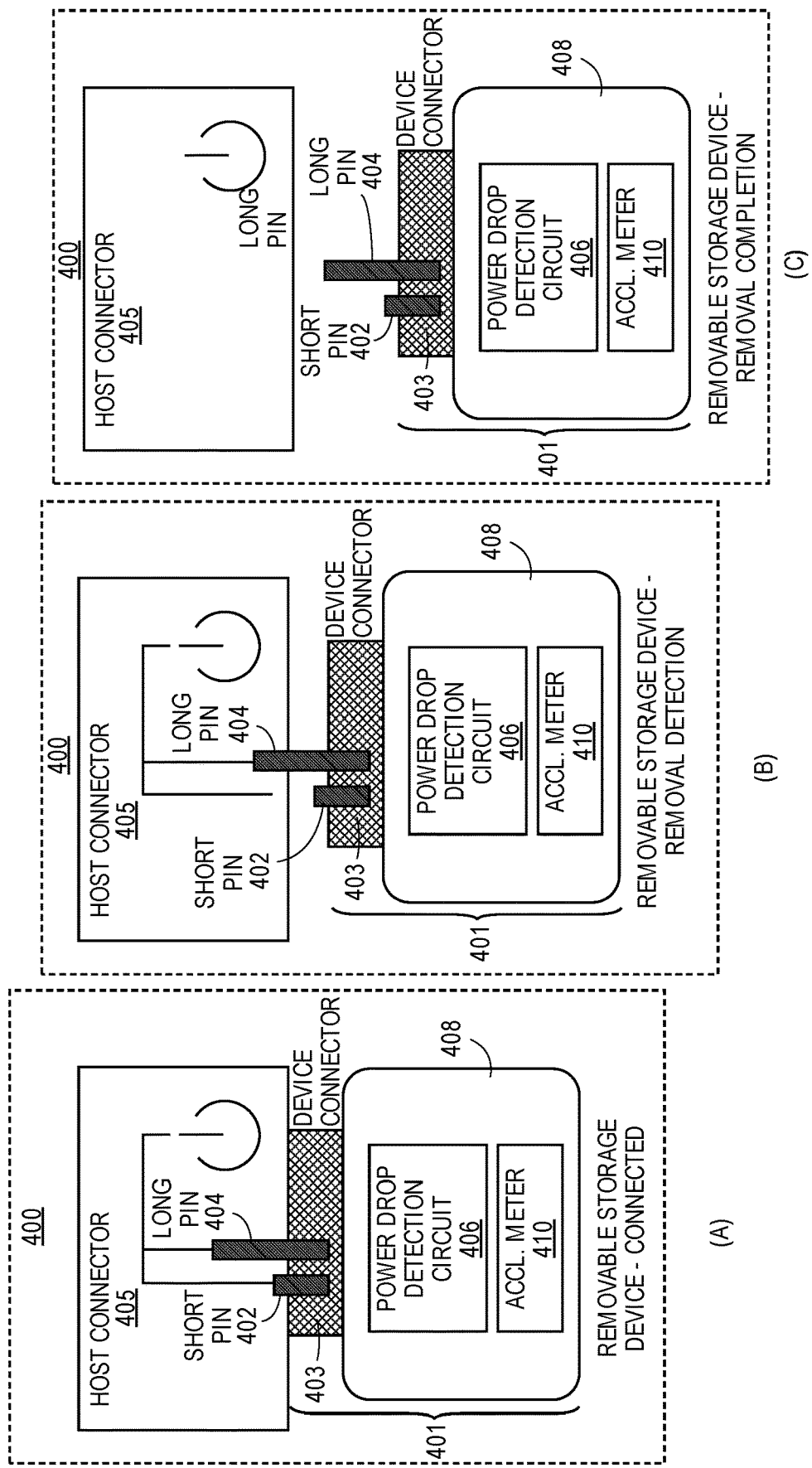
FIG. 4 is a diagram illustrating a system for device removal detection, according to an embodiment.

FIG. 4 is a diagram illustrating a system for device removal detection, according to an embodiment. The approaches described herein for detecting the removal of a data storage device from a data storage system utilize aspects of the mechanism of connection of the storage device. Removal detection means 400 comprises an electrically-conductive first pin 402, of a device electrical connector 403 ("device connector 403") of a storage device 401, and an electrically-conductive second pin 404 of the device connector 403, which is longer than the first pin 402. In the diagram of FIG. 4(A) both the short ("first") pin 402 and the long ("second") pin 404 are electrically connected with a host electrical connector 405 ("host connector 405") and thus powered (e.g., and connected to ground (GND) via a pull-down resistor), where the host connector 405 along with the device connector 403 cooperatively correspond to an electrical and physical interface to a host as described elsewhere herein. Removal detection means 400 further comprises a power drop detection circuit 406 of a device controller 408 (see also, e.g., DSD controller 308 of FIG. 3), configured for measuring the voltage associated with, corresponding to, across each of the pins 402, 404. For non-limiting examples, the electrical connector 403 may be physically connected to a host connector 405 constituent to a system backplane or some other form of a communications bus, a system controller board/circuitry, and the like.

Generally, when the storage device 401 is removed (e.g., electrically disconnected from the host and thus the host connector 405) without notice, the difference in pin length of pin 402 and pin 404 causes the shorter pin 402 to be removed before the longer pin 404. This temporary change in the supplied power to the electrical connection corresponding to device connector 403 and host connector 405 enables the passing of an indication that this occurrence is a device removal rather than a random power drop. With a random power drop event both pins 402, 404 likely lose power simultaneously and, therefore, such an event does not and is not intended to qualify as a device removal detection and no subsequent data destruction activity is warranted.

The diagram of FIG. 4(B) illustrates the storage device 401 in the process of removal, whereby the short pin 402 is removed, disconnected, detached from the host connector 405 before the long pin 404 is removed, and the power drop detection circuit 406 ("detection circuit 406") is configured to detect the short pin 402 removal while the long pin 404 remains electrically connected to the host connector 405. This situation is considered a potential removal state, in which the short pin 402 has lost power (e.g., pull-down (GND) detected) while the long pin 404 is still powered. According to an embodiment, here the detection circuit 406 sets or causes the setting of a flag indicating the short pin 402 disconnection as detected by short pin 402 power reduction/removal. Furthermore and according to an embodiment, setting such a flag may trigger preparation for a successive step or action, i.e., while there is still power supplied to the storage device 401. This preparation may be especially pertinent to hard disk drive DSDs which may not be configured or provisioned with much of a source of power, e.g., for data destruction, after main power is inadvertently removed from such a device (e.g., in contrast to an enterprise storage SSD which is likely provisioned with one or more power loss capacitors, such as power loss capacitor 174 of FIG. 1A), such as in an emergency power off (EPO) scenario.

The diagram of FIG. 4(C) illustrates the storage device 401 with both pins 402, 404 removed, disconnected, detached from the host connector 405, whereby the detection circuit 406 detects the disconnection of both pins. This situation now implies a malicious device removal, in which both the short pin 402 and the long pin 404 have lost power (e.g., pull-down (GND) detected) because the device controller was not notified of this disconnection action in advance. According to an embodiment, here the detection circuit 406 sets or causes the setting of another flag, indicating the long pin 404 disconnection as detected by long pin 404 power reduction/removal.

Figure 5:
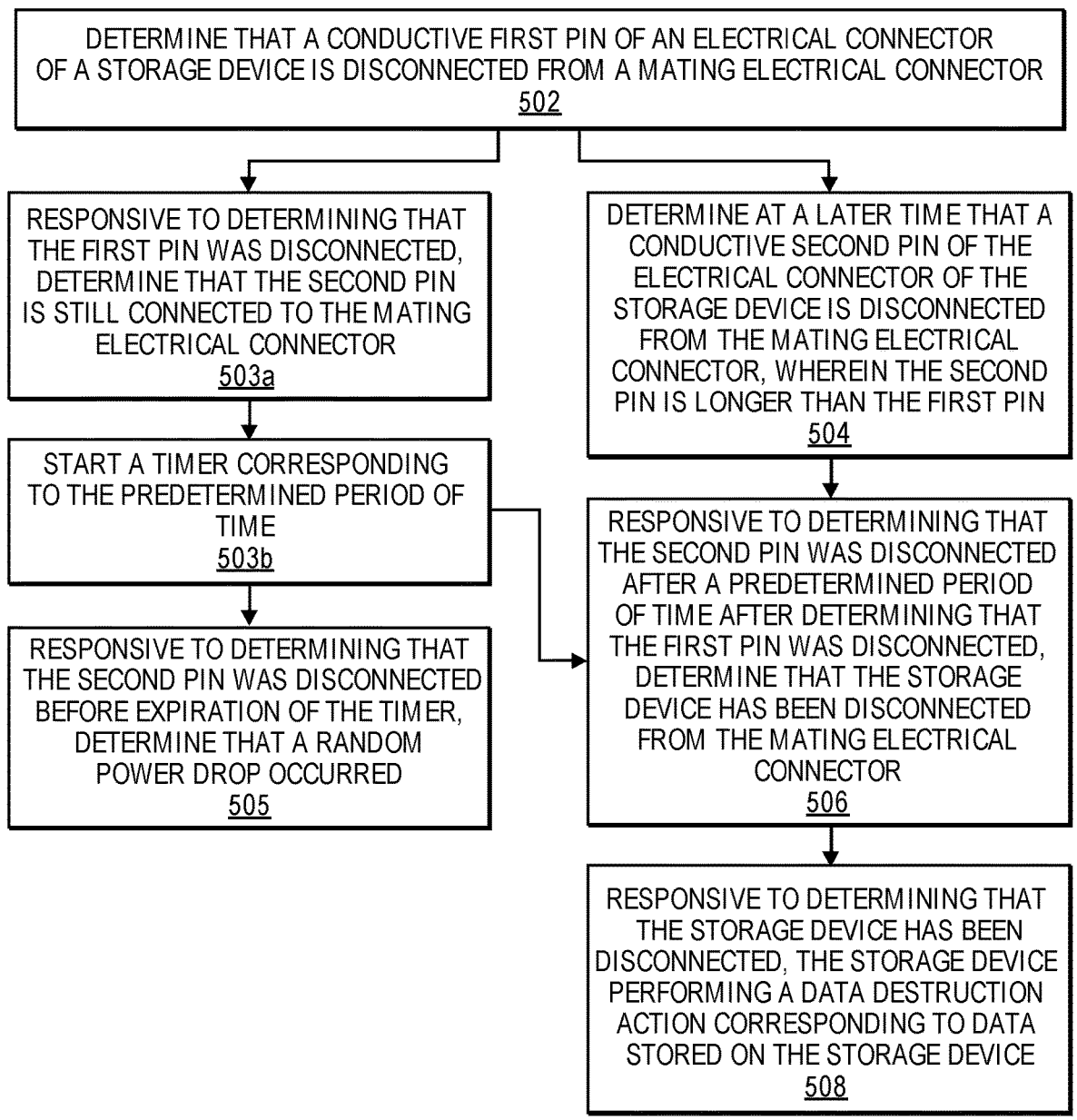
FIG. 5 is a flow diagram illustrating a method for detecting removal of a storage device, according to an embodiment.

FIG. 5 is a flow diagram illustrating a method for detecting removal of a storage device, according to an embodiment. Processing, functions, procedures, actions, method steps, and the like, that are described herein may include enactment by execution of one or more sequences of one or more instructions stored in one or more memory units and which, when executed by one or more processors, cause such performance. Therefore, the computing process or procedure of FIG. 5 may be implemented for execution as one or more sequences of one or more instructions stored in one or more memory units and which, when executed by one or more processors, cause performance of the blocks illustrated in FIG. 5. Referenced controllers may be embodied in any form of and/or combination of software, hardware, and firmware, such as an application-specific integrated circuit (ASIC) comprising at least one memory unit for storing such instructions and at least one processor for executing such instructions. For example, the method of FIG. 5 may be implemented for execution as one or more sequences of one or more instructions, e.g., firmware, stored or read into one or more memory units, e.g., memory 309 of FIG. 3, and which when executed by one or more processors, e.g., processor(s) 311 of FIG. 3, to cause performance of the illustrated method steps.

According to an embodiment, the security mode embodied in the method of FIG. 5 is enabled on a storage device (see, e.g. storage device 401 of FIG. 4) by an enabling command from the host (see, e.g., host 350 of FIG. 3). Such a command represents an agreement between the host and the storage device to activate the described security mode. Similarly and according to an embodiment, the data destruction portion alone may be enabled on the storage device via a respective command from the host.

At block 502, determine that a conductive first pin of an electrical connector of a storage device is disconnected from a mating electrical connector. For example, power drop detection circuit 406 (FIG. 4) of device controller 408 (see also, e.g., DSD controller 308 of FIG. 3) senses a power/voltage drop or power loss at short pin 402 (FIG. 4) of device connector 403 of storage device 401 (FIG. 4). Consistent with the diagram of FIG. 4(B) the state of storage device 401 is considered in the process of removal, whereby the short pin 402 is removed, disconnected, detached from the host connector 405 before the long pin 404 is removed. As described and according to an embodiment the detection circuit 406 may cause the raising or setting of a flag indicating the short pin 402 is disconnected from the host connector 405, which may trigger preparation for a successive step or action. For a non-limiting example, storage device 401 may identify and/or store in local memory a portion of the operating code involving a form of data destruction (e.g., the decryption key, as described in more detail elsewhere herein), such that the key may be readily erased responsive to a complete device removal detection determination.

With reference to the right side of the flow diagram of FIG. 5, at block 504, determine at a later time that a conductive second pin of the electrical connector of the storage device is disconnected from the mating electrical connector, wherein the second pin is longer than the first pin. For example, power drop detection circuit 406 senses a power/voltage drop or power loss at long pin 404 (FIG. 4) of device connector 403 of storage device 401. Consistent with the diagram of FIG. 4(C) this situation now implies a malicious device removal, in which both the short pin 402 and the long pin 404 have lost power thereby indicating removal, disconnection, detachment from the host connector 405. As described and according to an embodiment, here the detection circuit 406 may cause the raising or setting of another flag indicating both the short pin 402 and the long pin 404 are disconnected from the host connector 405. Otherwise, if power drop detection circuit 406 does not sense a power drop or power loss at long pin 404 subsequent to sensing the power drop or power loss at short pin 402 (block 502), then device controller 408 determines that a more common non-malicious device power aberration occurred.

At block 506, responsive to determining that the second pin was disconnected after a predetermined period of time after determining that the first pin was disconnected (at block 504), determine that the storage device has been disconnected from the mating electrical connector. For example and according to an embodiment, disconnection of and consequent loss or drop in power to both the short pin 402 and the long pin 404 is sufficient to conclude that storage device 401 has been disconnected from the host connector 405 (see also, e.g., host 350 of FIG. 3), rather than a random power drop to the pins 402, 404, of storage device 401, and therefore that a malicious device removal has occurred. Indication of device removal may be conducted by capturing the voltage drop event to memory, without the need to use additional power.

Thus, at block 508, responsive to determining that the storage device has been disconnected, the storage device performs a data destruction action corresponding to data stored on the storage device. As discussed, according to an embodiment the data destruction is responsive to previously receiving an enabling command or request from the host. This response may involve some action or operation to prevent the attacker from reading the data in the storage device 401, and the action should be of low power consumption because the storage device 401 is detached from a power source at this point. In the context of an SSD, one or more "power loss" capacitor(s) on a constituent PCB (printed circuit board) may supply enough energy to perform a data destruction action. For a non-limiting example, in an encrypted storage device 401 the device controller 408 of storage device 401 may erase the cryptographic key(s) associated with or corresponding to the data stored on storage device 401, e.g., by destroying, deleting, wiping a small amount of data and/or programming code. Here, while the data remains on the storage device 401 itself, by erasing the original encryption key the data is effectively impossible to decrypt and, therefore, the data is rendered unrecoverable. For another non-limiting example, device controller 408 may toggle or set the storage device 401 into a device "lock mode" to render the device inoperable.

According to an embodiment, rather than performing a data destruction action corresponding to the data stored on the storage device 401, device controller 408 may otherwise trigger a data destruction action corresponding to data stored on the storage device 401. For a non-limiting example, storage device 401 may store in local memory, such as memory 309 (FIG. 3), an indication that the storage device 401 has been disconnected. Hence, upon reading such indication upon power being restored to the storage device 401, the storage device 401 formats/reformats itself. In the case of SSDs and flash memory generally, formatting typically entails a block erase procedure on every storage element in the flash array, e.g., by setting the voltage level on each storage element to a significantly higher level than the standard operating voltage and then dropping it to ground. This data destruction embodiment responsive to a device removal determination may apply to both encrypted and unencrypted drives, and may also apply to devices without Power Loss Protection (PLP) which may be unable to perform extensive operations after power is down.

With reference to the left side of the flow diagram of FIG. 5, at block 503a, responsive to determining that the first pin was disconnected, determine that the second pin is still connected to the mating electrical connector and, at block 503b, start a timer corresponding to a predetermined period of time. For example, after power drop detection circuit 406 senses a power/voltage drop or power loss at short pin 402 of device connector 403 of storage device 401 (at block 502), power drop detection circuit 406 determines at block 503a that the power to long pin 404 indicates that long pin 404 of device connector 403 is still connected to host connector 405. Responsively, device controller 408 starts a timer corresponding to the predetermined period of time consistent with block 506. If it is determined that the long pin 404 was disconnected after that predetermined time after detecting disconnection of the short pin 402 (at block 502) and corresponding to the timer set at block 503b, then it is concluded that the storage device 401 has been disconnected from the host connector 405, in accordance with block 506.

According to an embodiment, an acceleration meter 410 (FIG. 4) may be integrated into the device controller 408 to measure the acceleration of the storage device 401 at the time of the short pin 402 and/or long pin 404 removal to verify or confirm the device removal detection. In normal operation, there should be no acceleration measured on the acceleration meter 410. However, during a suspected device removal, some acceleration would be measured by the acceleration meter 410. This technique may be combined with the foregoing embodiment or work independently of it. For example, in addition to or alternatively to determining that the long pin 404 was disconnected after that predetermined time after detecting disconnection of the short pin 402, device controller 408 determines acceleration of the storage device and thereby verifies, confirms, affirms that storage device 401 has been disconnected from host connector 405 and that an unexpected device removal has been detected. The combination of conditions (i.e., pin removal, device acceleration) may differ depending, for example, on the certainty level needed to establish device removal, on the sensitivity of the corresponding sensors, and the like.

Otherwise, at block 505, responsive to determining that the second pin was disconnected before expiration of the timer, determine that a random power drop occurred. According to an embodiment, a host may be notified that there may be a power problem with the storage device, e.g., that a power drop was detected but with no further action needed or performed. For example, if power drop detection circuit 406 determines that the power to long pin 404 indicates that long pin 404 was disconnected from the host connector 405 before the timer ran out, then device controller 408 may notify host 350 that there may be a problem with powering storage device 401, i.e., that this sequence of events does not qualify as a device removal detection event.

As data security and protection is a critical aspect in the design of resilient storage devices and corresponding data storage systems, having the capability to detect an unexpected, possibly malicious removal of a storage device from its storage system is beneficial. With monitoring the power to each of multiple pins having different lengths, along with monitoring the relative delay in which such pins experience respective power reductions, suitable logic can rapidly discern between a device disconnection/removal event versus a simple device power aberration. In turn, suitable data destruction action can be taken to render the data stored on the storage device inaccessible to the attacker, thereby protecting the storage device even after the device is removed from the storage system. Such action may be taken immediately and completely by utilizing minimal power stored within the storage device or preliminarily and then completely upon repowering of the device, for examples.

Solid State Drive Configuration

Figure 1A:
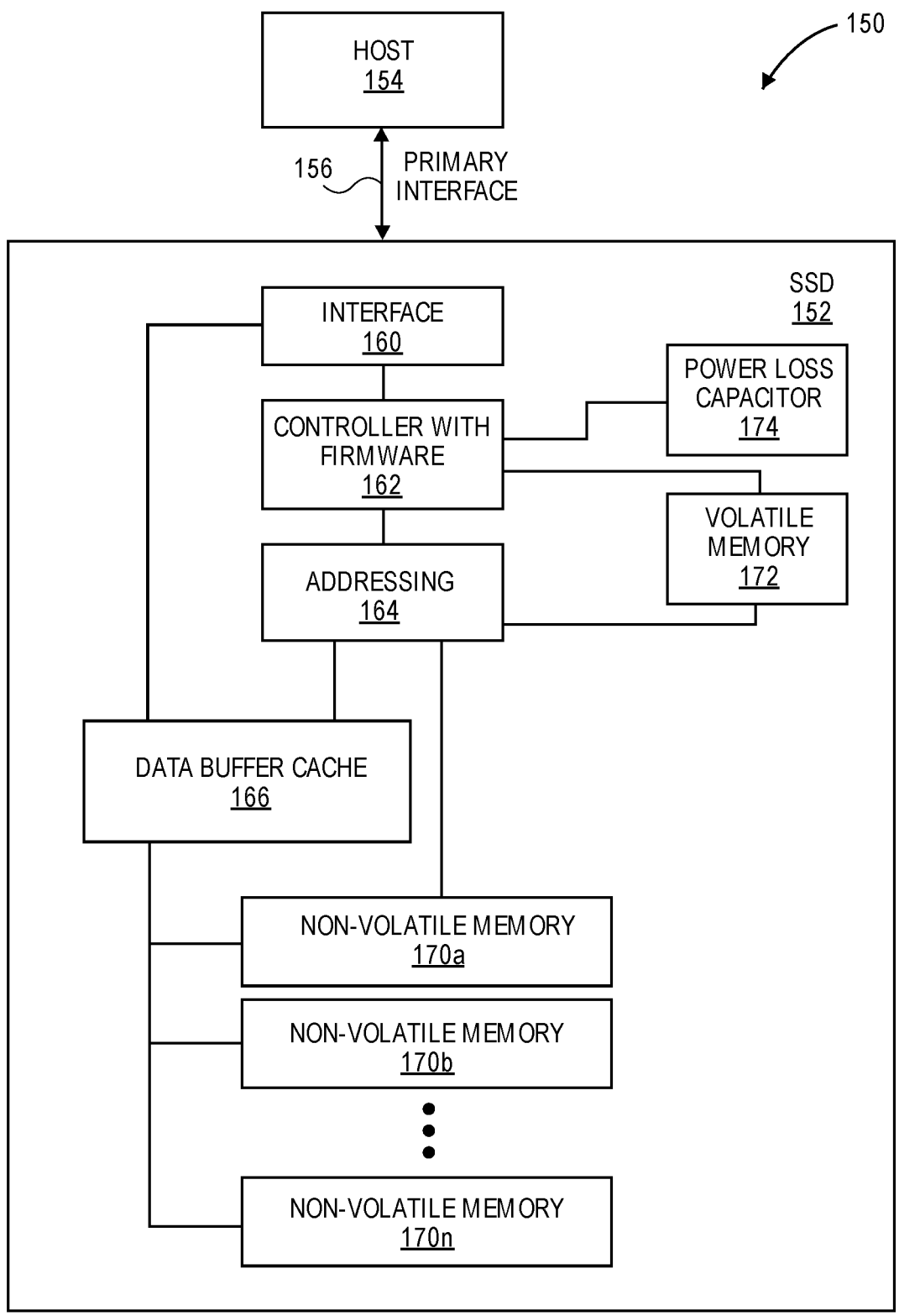
FIG. 1A is a block diagram illustrating a solid-state drive (SSD), according to an embodiment.

As discussed, embodiments may be used in the context of a data storage system including solid-state drives (SSDs). Thus, FIG. 1A is a block diagram illustrating an example operating context with which embodiments of the invention may be implemented. FIG. 1A illustrates a generic SSD architecture 150, with an SSD 152 communicatively coupled with a host 154 through a primary communication interface 156. Embodiments are not limited to a configuration as depicted in FIG. 1A, rather, embodiments may be implemented with SSD configurations other than that illustrated in FIG. 1A. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O (input/output) requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1A includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This enables a component to communicate with other components via an input/output (I/O) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND (NOT-AND) flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM (dynamic random-access memory) or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices. According to an embodiment, SSD 152 further comprises a power loss capacitor 174, which can be used as a source of a relatively small amount of stored power to perform data destruction activity subsequent to device removal detection and consequent loss of externally supplied power, as described elsewhere herein.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Hard Disk Drive Configuration

As discussed, embodiments may be used in the context of a data storage system including hard disk drives (HDDs). Thus, in accordance with an embodiment, a plan view illustrating an HDD 100 is shown in FIG. 1B to illustrate exemplary operating components.

Figure 1B:
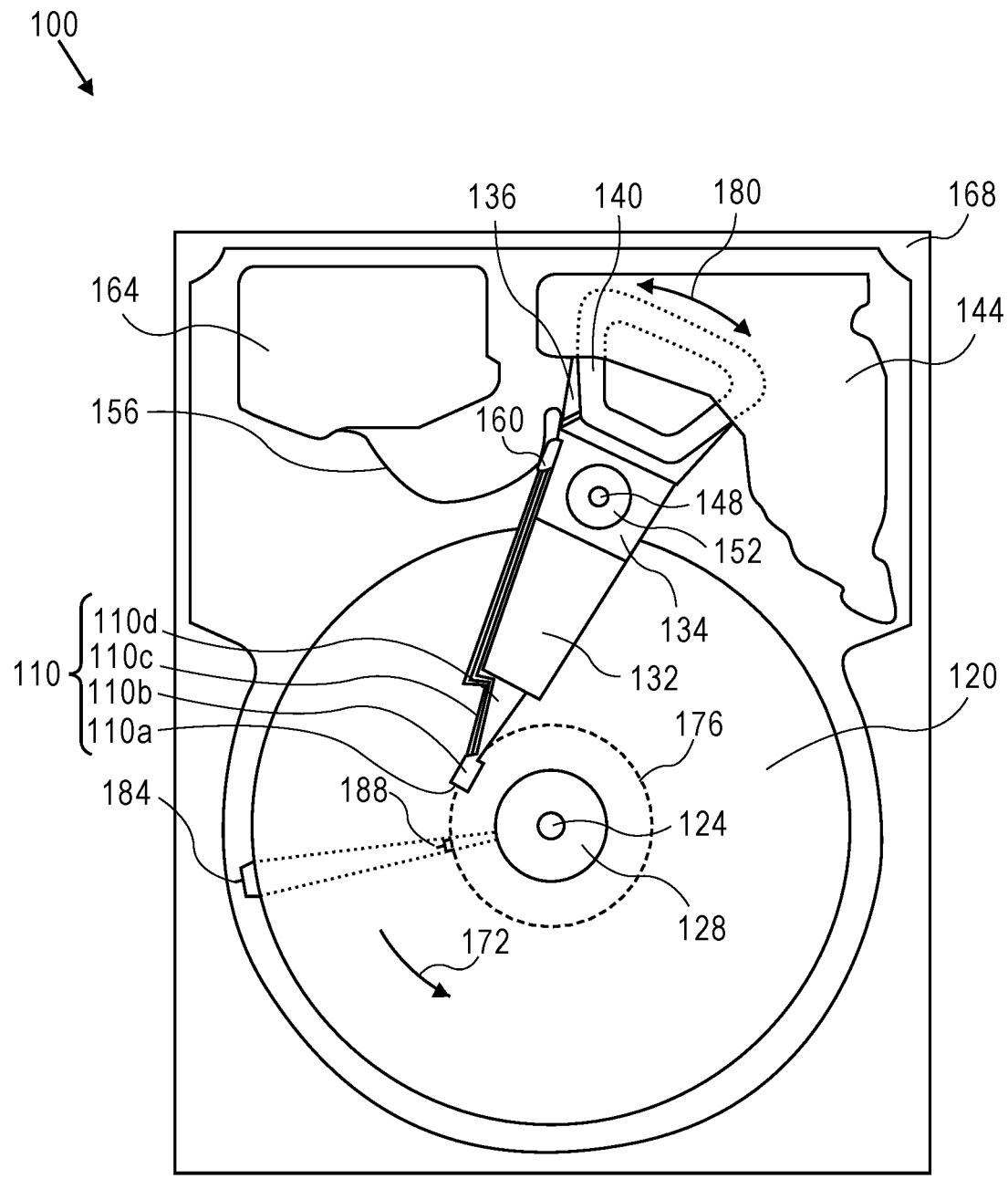
FIG. 1B is a plan view illustrating a hard disk drive (HDD), according to an embodiment.

FIG. 1B illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for detecting removal of a data storage device from a system, the method comprising:
   determining that an electrically conductive first pin of an electrical connector of a storage device is disconnected from a mating electrical connector by circuitry detecting a voltage drop corresponding to the first pin;
   determining at a later time that an electrically conductive second pin of the electrical connector of the storage device is disconnected from the mating electrical connector by circuitry detecting a voltage drop corresponding to the second pin, wherein the second pin is longer than the first pin;
   responsive to determining that the second pin was disconnected after a predetermined period of time after determining that the first pin was disconnected, determining that the storage device has been disconnected from the mating electrical connector; and
   responsive to determining that the storage device has been disconnected, triggering a data destruction action corresponding to data stored on the storage device.

2. The method of claim 1, further comprising:
   responsive to determining that the storage device has been disconnected, the storage device performing a data destruction action corresponding to data stored on the storage device.

3. The method of claim 2, wherein performing a data destruction action includes performing a data destruction action responsive to determining that a host enabled the data destruction on the storage device.

4. The method of claim 2, wherein the storage device performing the data destruction action includes the storage device erasing from memory a cryptographic key corresponding to the data.

5. The method of claim 2, wherein the storage device performing the data destruction action includes the storage device storing in memory an indication that the storage device has been disconnected, the method further comprising:
   responsive to reading the indication upon power being restored to the storage device, the storage device formatting itself.

6. The method of claim 1, further comprising:
   responsive to determining that the first pin was disconnected, determining that the second pin is still connected to the mating electrical connector; and
   starting a timer corresponding to the predetermined period of time.

7. The method of claim 1, further comprising:
   prior to triggering the data destruction action,
      determining acceleration of the storage device, and
      responsive to determining acceleration of the storage device, determining verification that the storage device has been disconnected; and
   responsive to determining verification that the storage device has been disconnected, triggering the data destruction action corresponding to data stored on the storage device.

8. The method of claim 7, wherein determining acceleration includes determining acceleration responsive to determining that the second pin is disconnected.

9. An electronic controller for a data storage device (DSD), the controller comprising:
   means for executing machine-executable instructions; and
   means for storing one or more sequences of machine-executable instructions which, when executed by the means for executing, cause performance of:
      determining that a conductive first pin of an electrical connector of the DSD is disconnected from a mating electrical connector by circuitry detecting a voltage drop corresponding to the first pin;
      determining at a later time that a conductive second pin of the electrical connector of the DSD is disconnected from the mating electrical connector by circuitry detecting a voltage drop corresponding to the second pin, wherein the second pin is longer than the first pin;
      responsive to determining that the second pin was disconnected after a predetermined period of time after determining that the first pin was disconnected, determining that the DSD has been disconnected from the mating electrical connector; and
      responsive to determining that the DSD has been disconnected, triggering a data destruction action corresponding to data stored on the DSD.

10. The electronic controller of claim 9, wherein the one or more sequences of machine-executable instructions, when executed by the means for executing, cause further performance of:
    responsive to determining that the DSD has been disconnected, performing a data destruction action corresponding to data stored on the DSD.

11. The electronic controller of claim 10, wherein performing a data destruction action includes performing a data destruction action responsive to determining that a host enabled the data destruction on the DSD.

12. The electronic controller of claim 10, wherein performing the data destruction action includes erasing from memory a cryptographic key corresponding to the data.

13. The electronic controller of claim 10, wherein performing the data destruction action includes storing in memory an indication that the DSD has been disconnected, wherein the one or more sequences of machine-executable instructions, when executed by the means for executing, cause further performance of:
  responsive to reading the indication upon power being restored to the DSD, formatting the DSD.

14. The electronic controller of claim 10, wherein:
  the DSD is a solid-state drive (SSD); and
  performing the data destruction action includes using power from an internal capacitor to perform the data destruction action.

15. The electronic controller of claim 9, wherein the one or more sequences of machine-executable instructions, when executed by the means for executing, cause further performance of:
  responsive to determining that the first pin was disconnected, determining that the second pin is still connected to the mating electrical connector; and
  starting a timer corresponding to the predetermined period of time.

16. The electronic controller of claim 9, wherein the one or more sequences of machine-executable instructions, when executed by the means for executing, cause further performance of:
  prior to triggering the data destruction action,
    detecting an acceleration of the DSD using an internal acceleration meter, and
    confirming that the DSD has been disconnected based on determining the acceleration of the DSD; and
  responsive to confirming that the DSD has been disconnected, triggering the data destruction action corresponding to data stored on the DSD.

17. A data storage device (DSD) comprising:
  non-volatile memory; and
  an electronic controller comprising:
    one or more processors configured for executing machine-executable instructions, and
    one or more memory configured for storing one or more sequences of machine-executable instructions which, when executed by the one or more processors, individually or in combination, cause performance of:
      determining that a conductive first pin of an electrical connector of the DSD is disconnected from a mating electrical connector by detecting a voltage drop corresponding to the first pin;
      determining at a later time that a conductive second pin of the electrical connector of the DSD is disconnected from the mating electrical connector by detecting a voltage drop corresponding to the second pin, wherein the second pin is longer than the first pin;
      responsive to determining that the second pin was disconnected after a predetermined period of time after determining that the first pin was disconnected, determining that the DSD has been disconnected from the mating electrical connector; and
      responsive to determining that the DSD has been disconnected, triggering a data destruction action corresponding to data stored on the DSD.

18. The data storage device of claim 17, wherein the one or more sequences of machine-executable instructions, when executed by the one or more processors, individually or in combination, cause further performance of:
  responsive to determining that the DSD has been disconnected, the DSD performing a data destruction action corresponding to data stored on the DSD.

19. The data storage device of claim 18, wherein performing the data destruction action includes storing in memory an indication that the DSD has been disconnected, and wherein the one or more sequences of machine-executable instructions, when executed by the one or more processors, individually or in combination, cause further performance of:
  responsive to reading the indication upon power being restored to the DSD, formatting the DSD.

20. The data storage device of claim 17, wherein the one or more sequences of machine-executable instructions, when executed by the one or more processors, individually or in combination, cause further performance of:
  prior to triggering the data destruction action,
    determining acceleration of the DSD, and
    responsive to determining acceleration of the DSD, determining verification that the DSD has been disconnected; and
  responsive to determining verification that the DSD has been disconnected, triggering the data destruction action corresponding to data stored on the DSD.

* * * * *